United States Patent [19]

Norsworthy

[11] Patent Number: 4,559,605
[45] Date of Patent: Dec. 17, 1985

[54] METHOD AND APPARATUS FOR RANDOM ARRAY BEAMFORMING

[75] Inventor: Keith Norsworthy, Bellevue, Wash.

[73] Assignee: The Boeing Company, Seattle, Wash.

[21] Appl. No.: 532,854

[22] Filed: Sep. 16, 1983

[51] Int. Cl.⁴ .................. G06F 15/31; G06F 15/332; G01S 3/80

[52] U.S. Cl. ..................... 364/726; 364/604; 364/728; 367/5; 367/122; 367/138; 250/265

[58] Field of Search ................. 364/600-602, 364/604, 715, 728, 726, 819, 821, 827; 367/3-5, 20-21, 99-103, 118-119, 122-126, 138, 141; 250/265-267, 269; 73/861.25, 861.26, 861.27

[56] References Cited

U.S. PATENT DOCUMENTS

| | | | |
|---|---|---|---|
| 3,460,145 | 8/1969 | Johnson | 343/100 |
| 3,579,180 | 5/1971 | Taddeo | 340/3 |
| 3,710,330 | 1/1973 | Walters | 343/100 SA |
| 3,873,958 | 3/1975 | Whitehouse | 340/6 R |
| 3,885,224 | 5/1975 | Klahr | 340/5 MP |
| 3,906,431 | 9/1975 | Clearwaters et al. | 367/126 X |
| 3,987,285 | 10/1976 | Perry | 235/152 |
| 4,001,763 | 1/1977 | van Heyningen | 340/3 PS |
| 4,014,023 | 3/1977 | Kirkland | 367/122 X |
| 4,025,769 | 5/1977 | Simpson et al. | 235/156 |
| 4,049,958 | 9/1977 | Hartmann | 235/193 |
| 4,056,715 | 11/1977 | Parent | 367/122 X |
| 4,060,792 | 11/1977 | van Heyningen | 340/6 R |
| 4,060,850 | 11/1977 | Speiser | 364/819 |
| 4,090,199 | 5/1978 | Archer | 343/100 SA |
| 4,107,685 | 8/1978 | Martin et al. | 367/122 X |
| 4,112,430 | 9/1978 | Ladstatter | 343/100 R |
| 4,170,766 | 10/1979 | Pridham et al. | 367/126 X |
| 4,203,162 | 5/1980 | Clearwaters et al. | 367/122 |
| 4,207,621 | 6/1980 | Clearwaters et al. | 367/122 |
| 4,287,580 | 9/1981 | Holzschuh | 367/122 X |
| 4,325,257 | 4/1982 | Kino et al. | 364/604 X |
| 4,336,607 | 6/1982 | Hill et al. | 367/123 |
| 4,420,825 | 12/1983 | Maynard et al. | 367/122 |

OTHER PUBLICATIONS

Bernard D. Steinberg, "The Peak Sidelobe of the Phased Array . . . " *IEEE Transactions on Antennas . . .*, vol. AP-20, No. 2, pp. 129-135 (Mar. 1972).

Abraham E. Ruvin et al, "Digital Multiple Beamforming Techniques for Radar" *IEEE*, 1978, pp. 152-163.

S. Patrick Pitt et al, "Design and Implementation of a Digital Phase Shift Beamformer" *J. Acoust. Soc. Am.*, Sep. 1978, pp. 808-814.

Primary Examiner—Gary V. Harkcom
Attorney, Agent, or Firm—Schwartz, Jeffery, Schwaab, Mack, Blumenthal & Evans

[57] ABSTRACT

A beamforming method and apparatus utilizing a plurality of sensing elements which are free to take up random positions. Each sensing element generates output signals in response to sensed radiation. The signals are fed to a data process or which generates Fourier frequency components of each output signal and selects a Fourier frequency component for each given radiation frequency to form a group of frequency components. The data processor performs a spatial convolution, interpolation and spatial Fourier transform followed by an averaging procedure in order to obtain an output signal which is indicative of the far field radiation power as a function of angle thus providing the desired beamforming information.

26 Claims, 21 Drawing Figures

OUTPUT FOR ONE ANGLE θ

SEPARATE OUTPUTS FOR MULTIPLE BEAM STEER ANGLES

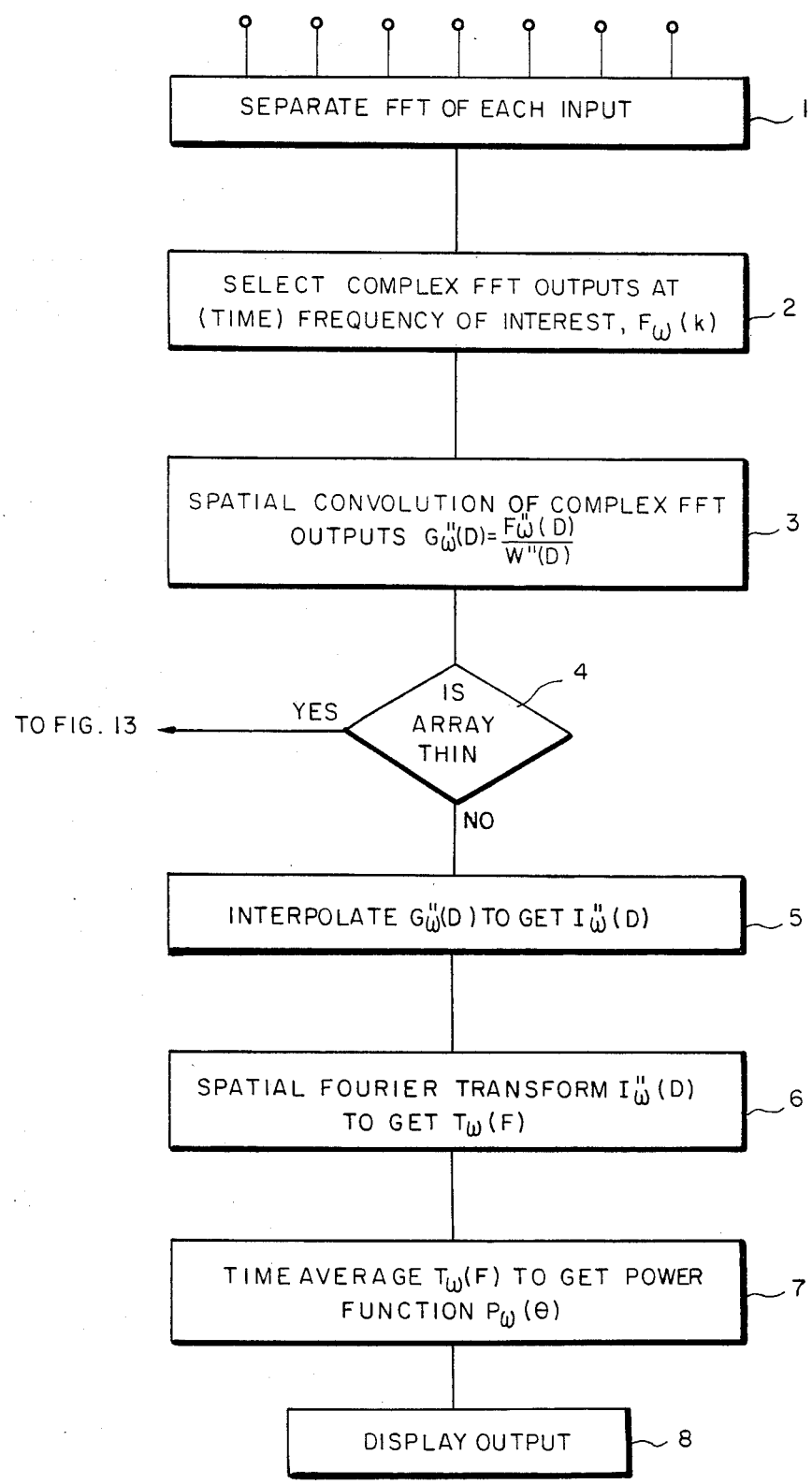

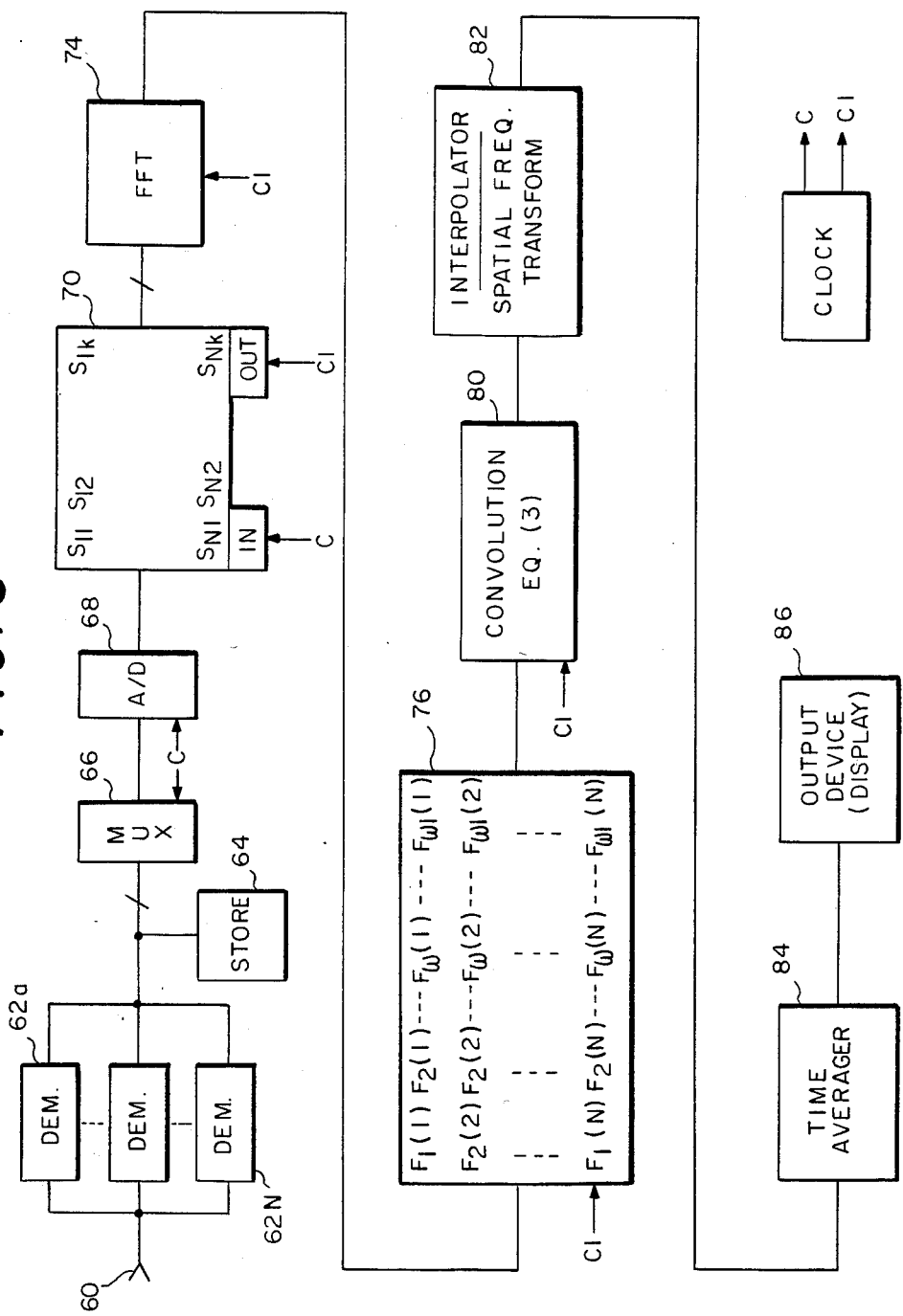

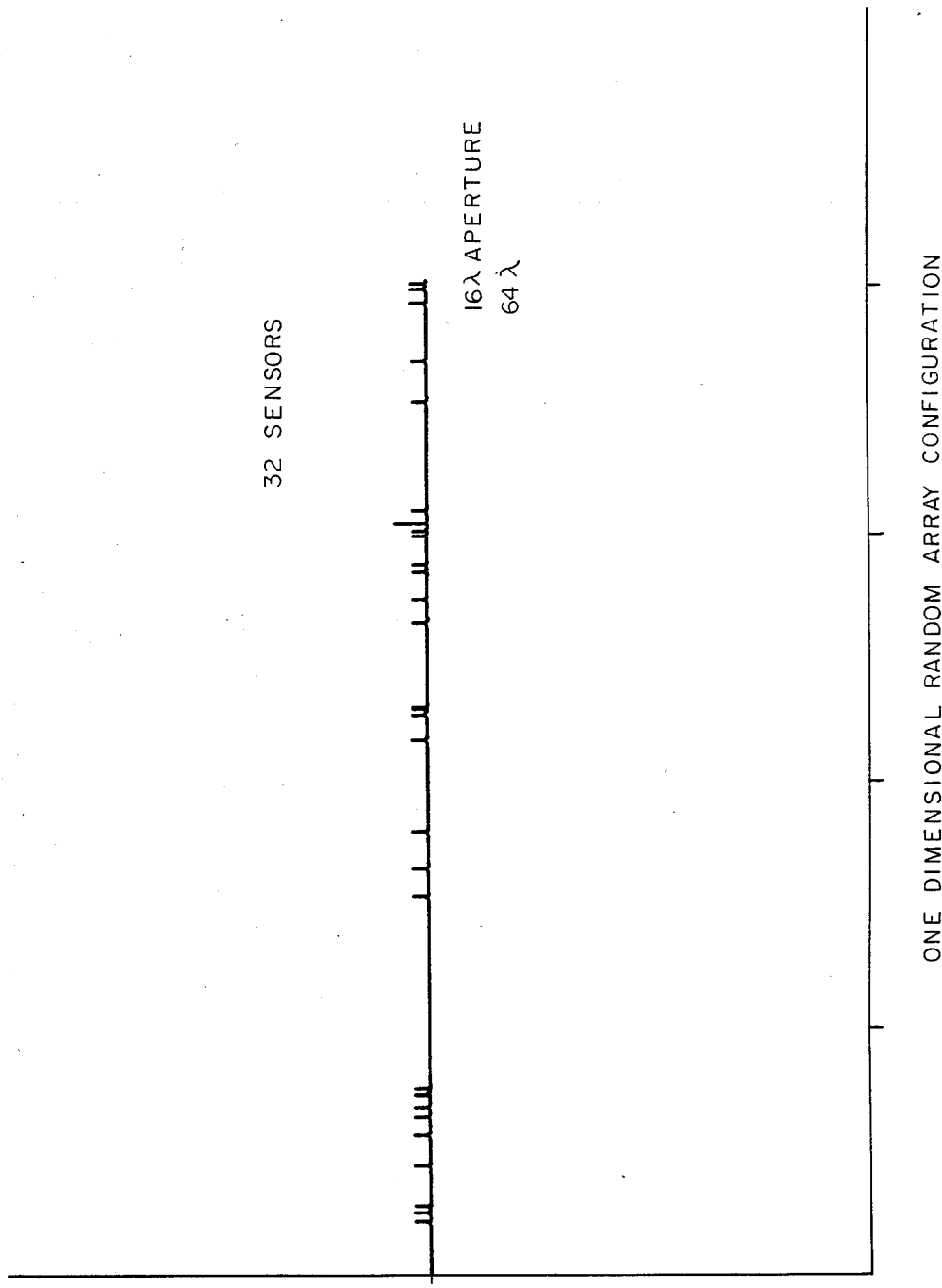

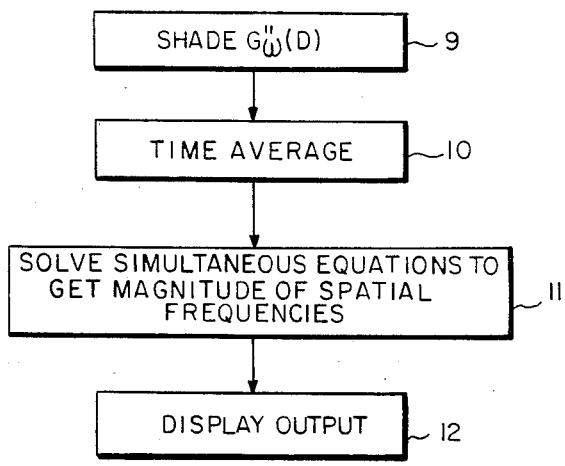
FIG. 13
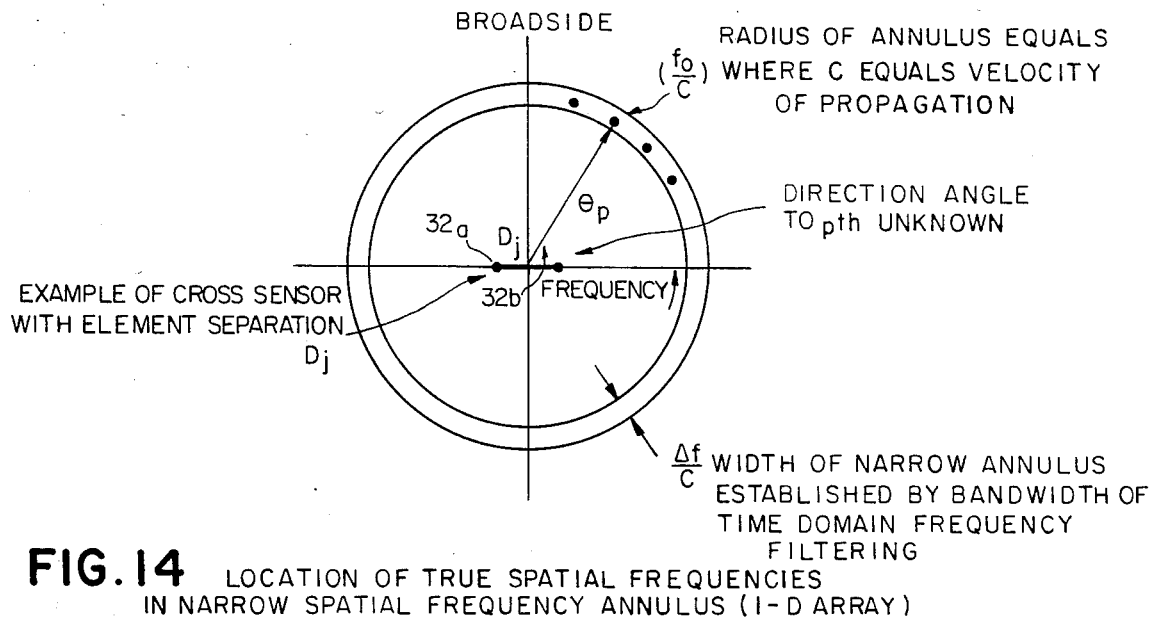
FIG. 14  LOCATION OF TRUE SPATIAL FREQUENCIES IN NARROW SPATIAL FREQUENCY ANNULUS (1-D ARRAY)
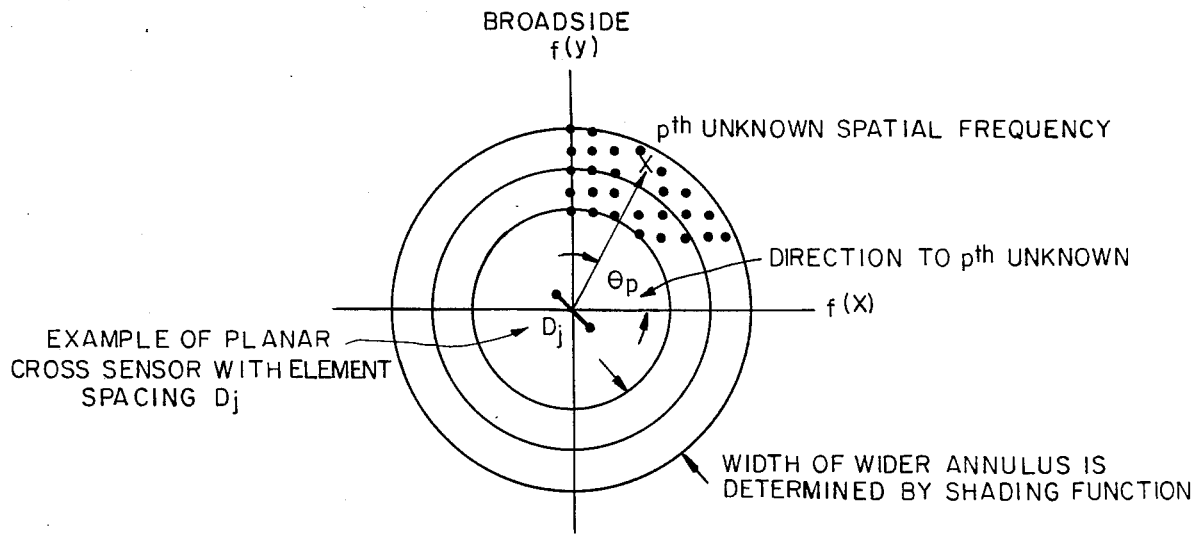
FIG. 15  LOCATION OF FARFIELD UNKNOWNS IN BROADER SPATIAL FREQUENCY ANNULUS (2-D ARRAY)

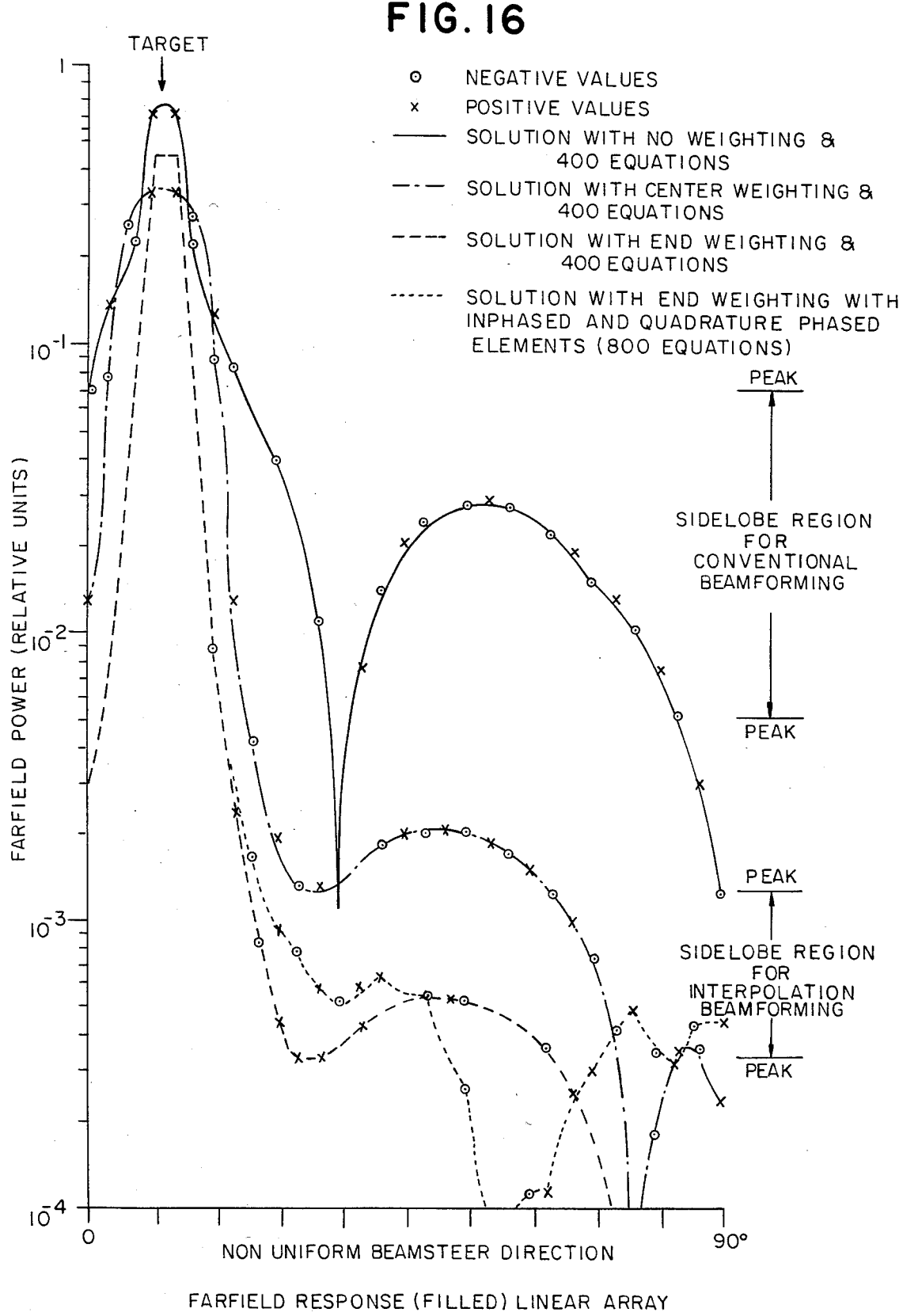

FARFIELD RESPONSE (THINNED) 2-D ARRAY

METHOD AND APPARATUS FOR RANDOM ARRAY BEAMFORMING

BACKGROUND OF THE INVENTION

The invention is in the field of beamforming and more particularly in the field of random array beamforming. Beamforming involves receiving signals from an array of sensing elements or transducers and processing these signals to provide an indication of the direction of the radiation source. The invention is particularly concerned with random arrays developed in water in which sonic energy is received from submerged or surface vessels.

Random arrays have several distinct advantages over fixed arrays. Random arrays are very simple to control in the sense of deployment and use. No problems of alignment are present in initially setting up the array, nor are there problems caused by variations in alignment during use. Further, for water deployed sensing elements, the free floating sensing elements are minimally affected by near field flow noise. In accordance with the invention, the number of free floating sensing elements may be reduced as compared with the number required for the same degree of sidelobe reduction comparable with non-random arrays.

Conventional methods of analyzing random array data are similar if not identical to the data processing applied to uniform arrays. Such random array treatments are shown, for example, in B. D. Steinberg, *Antenna Array System Design*, John Wiley 1975 and B. D. Steinberg "The Peak Lobe Response of Randomly Distributed Array Elements," *IEEE Transactions on Antennas and Propagation*, Seattle, 1972. According to Steinberg, the average power of a sidelobe of the beam pattern of a thinned random array is close to 1/N times that of the main beam, where N is the number of elements in the array. The peak power sidelobe is expected to be some 6–8 db higher. Such high sidelobes make it difficult to determine target position and even the number of targets of concern.

SUMMARY OF THE INVENTION

It is a general object of the invention to provide beam direction information from an array of randomly positioned sensing elements.

Another object of the invention is to improve random array beamforming results in comparison with conventional techniques.

Yet another object of the invention is to provide an improved beamforming method and apparatus that permits reduced sidelobes for enabling better resolution of the main peak for target direction determination.

The invention is particularly applicable in the field of anti-submarine warfare (ASW) surveillance. A plurality of sensing elements or sonobuoys may be air deployed and used as a free floating sensing array. However, the method and apparatus are also applicable to seismic arrays and arrays of radio frequency receivers.

A basic feature of the invention is the utilization of a power sensing beamformer which has improved sidelobe characteristics for random element arrays. The invention is to be distinguished from wavefrom beamformers which are responsive to time waveforms using delay and sum techniques. In applying the waveform beamformers, for application to ASW problems, it is sufficient to sense the time averaged frequency power spectrum of the target as opposed to the time fluctuations per se which are buried away down in the interference noise. The waveform beamformer must square and average the radiation pattern $S_\omega(\theta)$, but this process results in poor sidelobes when applied to random arrays. Thus, when listening in a given direction $\theta$, one picks up significant response from other interfering directions. The power steering beamformer in accordance with the invention significantly reduces these sidelobes in the non-source direction.

The method and apparatus of the invention are applicable to receiving beams but are not applicable in a transmit mode.

The invention may be characterized as a method of beamforming comprising the steps of deploying a plurality of sensing elements which are subsequently free to take up random positions, each sensing element generating output signals in response to sensed radiation; detecting output signales from each of the sensing elements; determining the relative positions of said sensing elements generating Fourier frequency components of the output signals; selecting a Fourier frequency component $F_\omega(k)$ for a given radiation frequency $\omega$ from said output signals of each of said sensing elements thereby forming a group of frequency components $F_\omega(k)$ where k is an integer identifying a sensing element and having values $k=1,2\ldots N$, where N is the integer number of deployed sensing elements; spatially convolving the group of frequency components to obtain a set of coefficients $G_\omega''(D)$ where D is the spacing between pairs of sensing elements; interpolating additional values of $G_\omega''(D)$ between the set of coefficients to obtain a substantially continuous function $I_\omega''(D)$; spatially Fourier transforming $I_\omega''(D)$ to obtain the transform function $T_\omega''(F)$, where F is a parameter representing different spatial frequencies in the $I_\omega''(D)$ function; averaging a plurality of values of at least one of $G_\omega''(D)$, $I_\omega''(D)$ and $T_\omega''(F)$; and after the immediately preceeding step, providing an output of said average or average-derived transform function $T_\omega''(F)$ indicative of the far field power of the radiation as a function of angle $\theta$.

The invention may also be characterized as a method for beamforming comprising the steps of deploying a plurality of sensing elements, said sensing elements free to take up random positions, each sensing element generating output signals in response to sensed radiation; detecting output signals from each of the sensing elements; determining the relative positions of said sensing elements; generating Fourier frequency components of the output signals; selecting a Fourier frequency component $F_\omega(k)$ for a given radiation frequency $\omega$ from said output signals of each of said sensing elements thereby forming a group of frequency components $F_\omega(k)$ where k is an integer identifying a sensing element and having values $k=1,2\ldots N$, where N is the integer number of deployed sensing elements; spatially convolving the group of frequency components to obtain a set of coefficients $G_{107}''(D)$ where D is the spacing between pairs of sensing elements; multiplying the set of coefficients $G_\omega''(D)$ by applying a shading function thereto, said shading function weighting small values of D more heavily than larger values; taking a time average value of the shading multiplied coefficients $G_\omega''(D)$ to obtain $\overline{G_\omega''(D)}$; solving a set of simultaneous equations for the unknown spatial frequency coefficients $X_p$ $$\sum_{P=1}^{M} X_p \cos\left\{ 2\pi \frac{D_j}{X_p} \cos(\alpha_j - \theta_p) \right\} = W_j Re[\overline{G''_\omega(D)}]$$

where $1/\lambda_p$ is the spatial frequency of the $p^{th}$ unknown,
$\theta_p$ is the direction angle to the $p^{th}$ unknown,
$D_j$ is the $j^{th}$ cross sensor separation,
$\alpha_j$ is the $j^{th}$ cross sensor angle,
$W_j$ is the weighting factor,
$Re[\overline{G_{107}''(D)}]$ is the real part of $G_\omega''(D)$, and
M is the number of orthogonal frequency components; and
providing an output for said spatial frequency coefficient $X_p$ as a function of $\theta_p$.

BRIEF DESCRIPTION OF THE DRAWINGS

The invention will be described in reference to the accompanying drawings, wherein:

FIG. 7 is a flowchart showing an interpolation technique utilized in the convolution process in accordance with the principles of the invention;

FIG. 8 is a block diagram showing the hardware elements utilized in implementing the flowchart of FIG. 7;

FIG. 9 is a sensor location plot which describes the location of the plurality of sensors in a one dimensional array;

FIG. 13 is a block diagram of the simultaneous equation technique utilized in the beamforming process;

FIG. 14 is a diagrammatic representation of a one dimensional array depicting the location of the true spatial frequencies in a narrow spatial frequency annulus;

FIG. 15 is a diagrammatic representation of a two dimensional array depicting the location of farfield unknowns in a broader spatial frequency annulus;

FIG. 16 shows a polar plot of the results of the simultaneous equation technique for a linear random array.

DETAILED DESCRIPTION OF THE PREFERRED EMBODIMENTS

Figure 1:
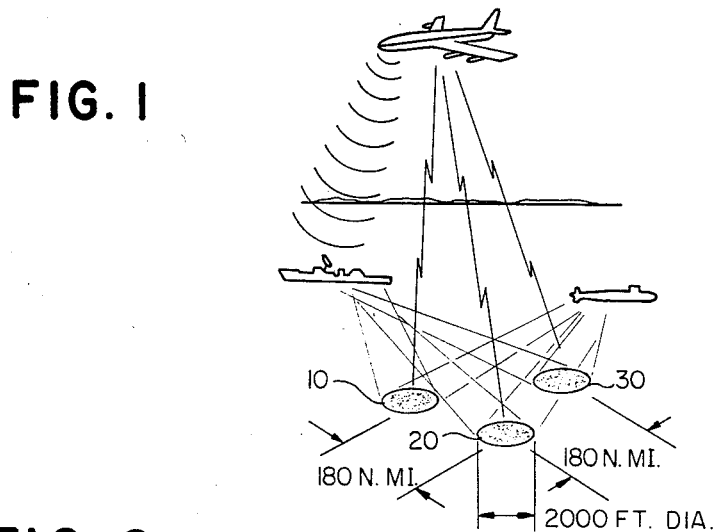
FIG. 1 is an illustration of the deployment of three random acoustic arrays being monitored by ship, submarine, and aircraft.
Figure 2:
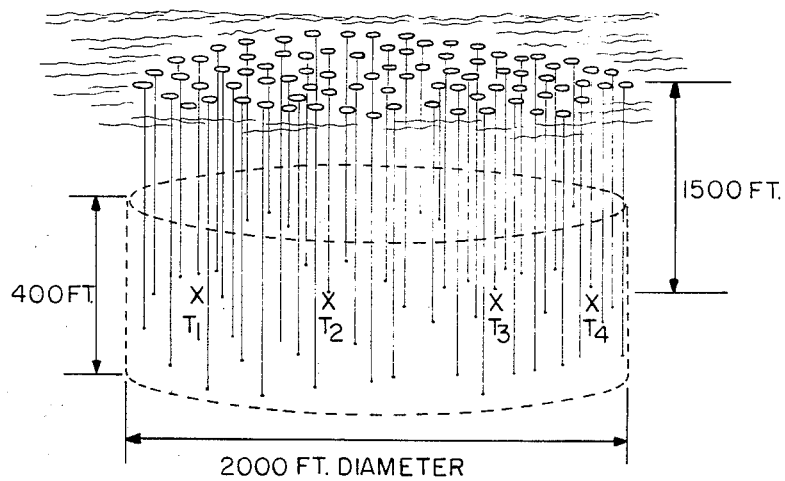
FIG. 2 is a diagrammatic view of a single array showing typical dimensions thereof.
Figure 3:
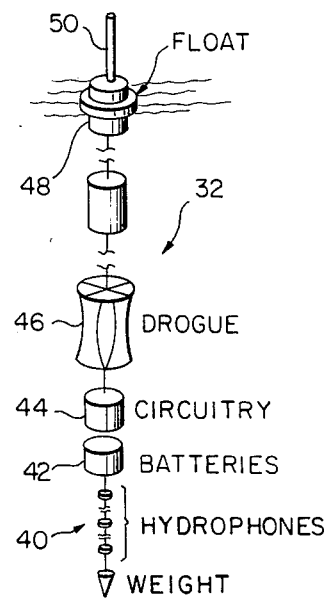
FIG. 3 is an exploded view of a typical sensing element of an array.

The invention is directed toward a random acoustic array as illustrated in FIG. 1. Three arrays 10, 20 and 30 are illustrated in FIG. 1 with typical dimensions of a given array shown in FIG. 2. As shown in FIG. 3, each element 32 in the array may contain sensing elements such as hydrophones 40, batteries 42, transmitting-/receiving (T/R) circuitry 44, drogue 46, float 48 and antenna 50. The T/R circuitry 44 may be standard circuit elements for transmitting a modulated radio signal representative of the electrical signal from the hydrophone which responds to the acoustic signals from, for example, a submarine. Receiving demodulator circuits on a ship or surveillance aircraft monitor the signals and process them to obtain bearing information on the sought-after submarine. The series of three such arrays 10, 20 and 30 may be conveniently used to obtain positional information by triangulation.

Within each deployed array, several of the array elements, typically four to six, contain a location transmitter utilized to transmit a location signal unique to the particular transmitter and recognizable by each of the array elements to initiate a response transmitted by each element identifying itself to the remote processing equipment. In this manner, again by triangulation, the relative position of each array element may be calculated for subsequent utilization in the data processing steps.

Uniformly Spaced Arrays

Figure 4:
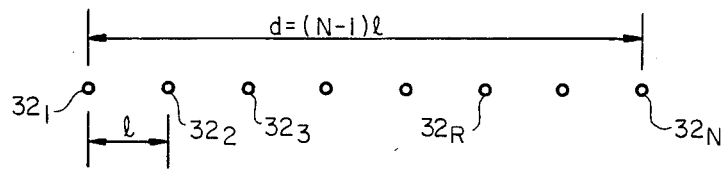
FIG. 4 illustrates a uniform spaced linear array.

Prior to treating the problem of randomly spaced arrays, it is helpful to describe the uniformly spaced linear array as shown in FIG. 4. Sensor elements $32_1$, $32_2 \ldots 32_k \ldots 32_N$ are spaced apart from adjacent elements by equal distances (l) along a line. In such a uniformly spaced, linear array, the spatial beamwidth, after beamforming, is related to 1/d where d is the total aperture equal to $(N-1)\cdot(l)$, N being the number of elements. The sidelobes of the formed beam can be improved, i.e., reduced, by shading the array which corresponds to weighting the signals from sensors in the center of the array more heavily than the signals from sensors at the ends of the array. The reduced sidelobes are, in this case, accompanied by a tolerable widening of the main beam. When sensing spatial signals that have wavelength $\lambda$, it is satisfactory for the element separation distance l, to be equal to $\lambda/2$. If $0 < l < \lambda/2$ the beamforming pattern is unaltered from that obtained with $l32\lambda/2$. If $l > \lambda/2$, the array is said to be "thinned" and its beam pattern exhibits undesirable ambiguities.

Prior Art Beamforming Processes

Figure 5A:
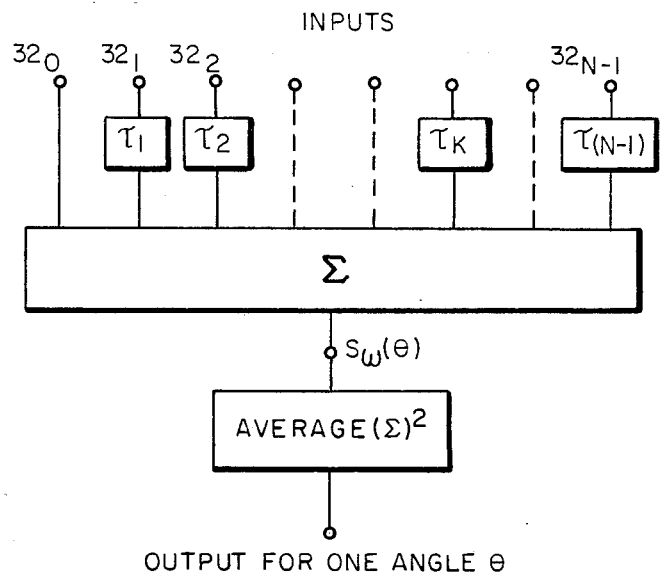
FIG. 5A is a block diagram illustrating the algorithm utilized in the delay and sum beamforming technique.
Figure 5B:
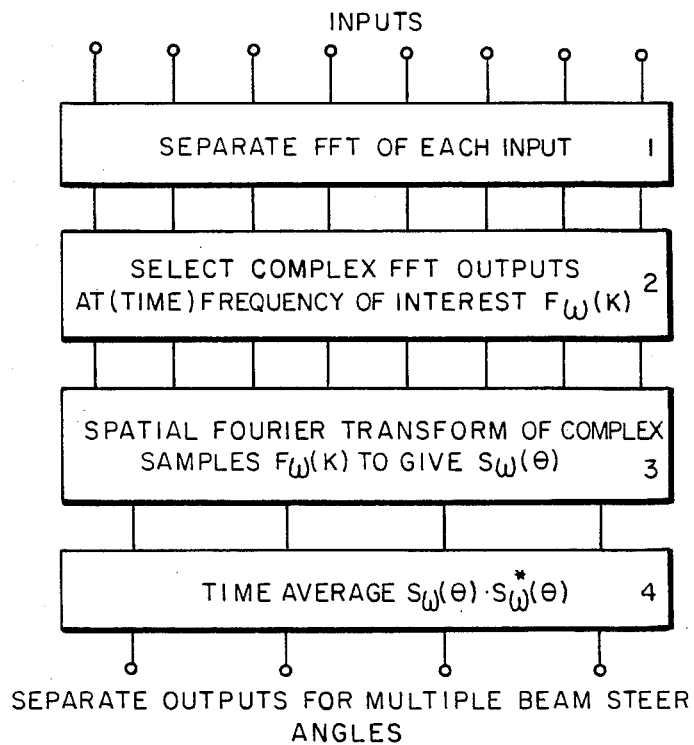
FIG. 5B is a block diagram illustrating the algorithm utilized in the fast Fourier transform beamforming technique.

There are two widely accepted prior art methods of beamforming, namely, (1) delay and sum beamforming and (2) Fast Fourier Transform (FFT) beamforming. These two methods are illustrated in FIGS. 5A and 5B. Although diffferent processing equipment is utilized in carrying out these methods, they are equivalent in regard to the overall result.

A flowchart of the delay and sum technique is shown in FIG. 5A. This technique employs a plurality of omnidirectional sensors $32_0 \ldots 32_k \ldots 32_{N-1}$ wherein a delay $\tau_k$ is added to each signal channel (relative to a reference or origin, e.g., sensor $32_0$), and then each sample is summed with the remaining samples to give the composite signal waveform. The composite signal is then time frequency filtered to give the waveform $S_{107}(\theta)$ at the selected frequency $\omega$. Different beamsteering angles $\theta$ are processed one at a time by varying $\tau = 1 \sin \theta/c$ where c is the radiation propagation speed. The composite signal $S_\omega(\theta)$ is then squared and time averaged (average of plural samples taken) to give the power as a function of $\theta$ at the selected time frequency $\omega$. As a practical matter, the time frequency filtering could take place on the individual input channels prior to summation with equivalent results being obtained.

A block flowchart of the FFT beamforming method is shown in FIG. 5B. In step 1, a separate FFT operation is performed on signals received from each sensor, and in step 2, a time frequency filtering is achieved by selecting from each input channel the complex components $F_\omega(k)$ associated with a selected frequency $\omega$. A spatial Fourier transform (usually performed by FFT techniques) is then performed in step 3 for processing all beamsteering angles $\theta$ (at frequency $\omega$) simultaneously to give the complex components $S_\omega(\theta)$. Conjugate multiplication of $S_\omega(\theta)$ is then performed, and the results are time averaged (step 4). Separate power outputs are obtained for miltiple angles $\theta$. In both the FFT and delay and sum techniques, shading may be utilized to improve sidelobe performance of arrays that have uniformly (not randomly) separated elements.

One-Dimensional Arrays with Random Element Spacings

Generally accepted methods of beamforming for random arrays are identical to those for a uniform array. A representative teaching of the prior art may be found in the publication of Bernard Steinberg entitled "The Peak Sidelobe of the Phased Array Having Randomly Located Elements" appearing in *IEEE Transactions on Antennas and Propagation*, Vol. 20, No. 2, March 1972, page 129. In such prior art systems, the average (power) sidelobe of the beam pattern of a thinned random array is close to 1/N times the main beam, where N is the number of elements in the array. The peak (power) sidelobe is expected to be some 6 to 8 db higher. Furthermore, array shading techniques which are applicable for periodic arrays are not effective in reducing sidelobes of random arrays. The term "thinned" random array relates to an array in which $N < 2d/\lambda$.

When applying the delay and sum beamforming method (FIG. 5A) to the random line array, the correct amount of delay to be applied to each sensing element k is $\tau_k$:

$$\tau_k = l_k \frac{\sin \theta}{C}$$

where $l_k$ is the spacing associated with sensing element $32_k$, $\theta$ is the steer angle measured from broadside and C is the velocity of propagation in the medium considered.

When applying the FFT beamforming method (FIG. 5B) to the random array, exactly equivalent results are obtained if one implements the spatial Fourier transform equation:

$$S_\omega(\theta) = \sum_{K=1}^{K=N} F_\omega(k) e^{j\phi_k} \quad (1)$$

where $\phi_k = \frac{2\pi d_k \sin \theta}{\lambda}$ (2)

and $F_\omega(k)$ are the FFT outputs corresponding to the individual sensing elements of the array for the time frequency $\omega$.

Windowed Observations of a Continuous One-Dimensional Array

In describing the Beamforming method and apparatus of the invention, it is useful to first discuss a hypothetical "Continuous Array" which is considered to be completely filled with receiving elements, i.e., l=zero and N=infinity.

Figure 6A:
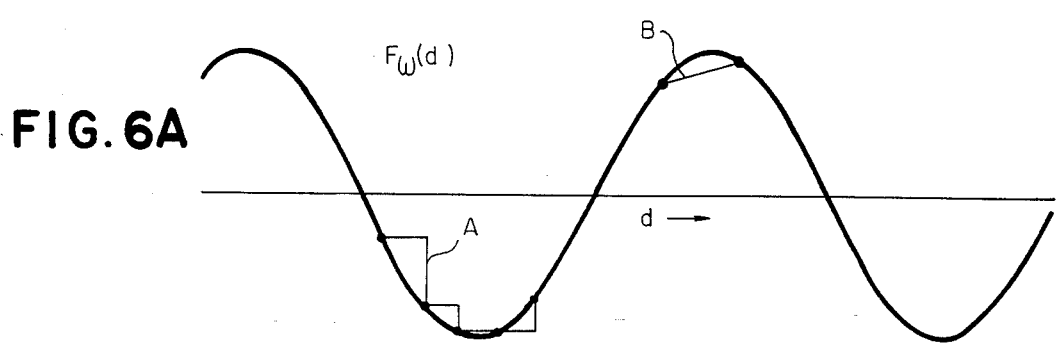
FIGS. 6A–6D depict graphs utilized in explaining the beamforming method in accordance with the principles of the invention.
Figure 6B:
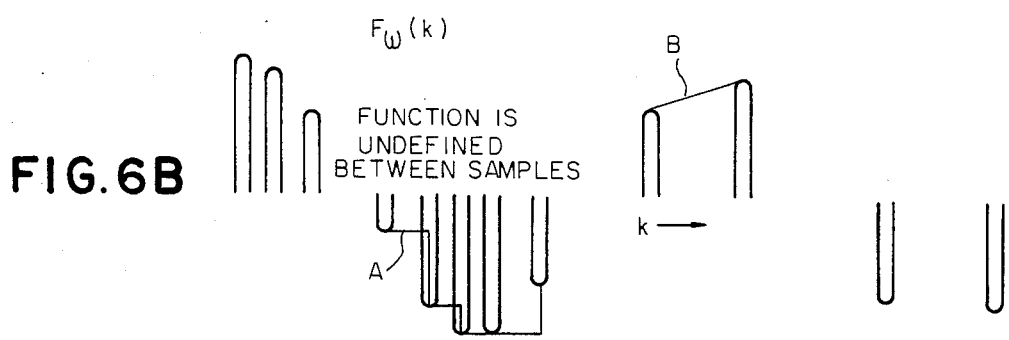

All practical arrays can be considered as providing windowed observations of the continuous functions that would arise from the hypothetical continuous array. In reference to FIGS. 6A-6D, FIG. 6A is a continuous function of the Fourier coefficient $F_\omega(d)$ wherein d represents distance and is used to indicate the continuous nature of the function. The continuous function $F_\omega(d)$ is the limit of the discrete function $F_\omega(k)$, for $1 < k \leq N$, where N approaches infinity and the spacing l approaches zero. $F_\omega(k)$ shown in FIG. 6B is a windowed observation of $F_\omega(d)$. $F_\omega(k)$ is basically a random spatial sampling of the spatial function $F_\omega(d)$. It is a discontinuous function and undefined in the spaces between the samplings.

Utilizing an FFT analysis approach, a spatial Fourier transform of the continuous function $F_\omega(d)$ would lead to the beamforming information most desired. However, the finite number of sensing elements imposes the discontinuous function $F_\omega(k)$ instead of $F_\omega(d)$.

Figure 6C:
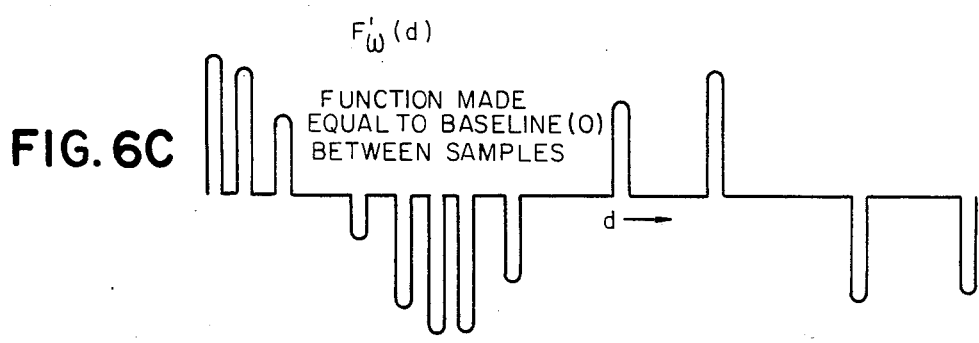
Figure 6D:

The discrete Fourier transform of $F_\omega(k)$ can be shown to equal the (continuous) Fourier transform of a continuous function $F_\omega'(d)$, where $F_\omega'(d)$ is constructed by putting zero values between the (finite width) discrete samples of $F_\omega(k)$, as shown by FIG. 6C.

If the sensing elements are equally spaced and $l < \lambda/2$, the Fourier transform of $F_\omega'(d)$ can be shown to be equal to the Fourier transform of $F_\omega(d)$ so a uniformly spaced array may be said to be "Nyquist filled" as opposed to "completely filled" even though it contains only a finite number of samples. With random element spacing, the sidelobe characteristics of $F_\omega'(d)$ are inferior to those of $F_\omega(d)$ even when filled, i.e., $N > 2d/\lambda$. When N is substantially less than $(2d)/\lambda$, the sidelobe performance of $F_\omega'(d)$ is quite poor as, for example, Steinberg, op. cit.

Convolution Method and Apparatus

In accordance with the invention, an improved (i.e., decreased) sidelobe performance may be obtained for random arrays using a convolution process. Two embodiments, both using the convolution process, are set forth, the first using an interpolation technique and the second a simultaneous equation technique. The interpolation technique is illustrated in the block flowchart of FIG. 7.

Interpolation Technique

As illustrated in FIG. 7, the initial first and second steps in the convolution process are the same as in the prior art FFT beamforming method of FIG. 5B. In step 1, the input from the N sensing elements $32_k$ are digitized and the discrete Fourier transform for blocks of data are implemented, preferrably using an FFT algorithm. Selected Fourier coefficients $F_\omega$ (k) of desired frequency $\omega$ are grouped together in step 2. Rather than taking the Fourier transform at this stage, as was done in FIG. 5B, the spatial autoconvolution of complex coefficients $F_\omega$ (k) is performed on the sampled continuous function $F_\omega'$ (d) shown in FIG. 6C. The resulting autoconvolution function is normalized by dividing each convolution sum by the autoconvolution of the window function itself which is simply the unit sampling function shown in FIG. 6D. The convolution process may be written as follows:

$$G_\omega''(D) = \frac{F_\omega''(D)}{W''(D)} = \frac{\int F_\omega'(d) \cdot F_\omega'(d+D)d(d)}{\int W'(d) \cdot W'(d+D)d(d)} \quad (3)$$

where D is the magnitude of the vector separation distance between pairs of sensing elements.

All three functions $G_\omega''$ (D), $F_\omega''$ (D) and $W''$ (D) comprise discrete values beginning with D=0 and including a maximum of $1+(N^2-N)/2$ values distributed symmetrically around D=0.

The convolution having been performed in step 3, the next step is to determine whether the sensing element array is thin ($N<2d/\lambda$) or not as indicated in step 4. If the array is not thin, an interpolation technique is used on the convoluted sample points $G_\omega''$ (D) to obtain a continuous function $I_\omega''$ (D), as indicated at step 5. Two basic techniques are possible for performing the interpolation, namely, a sample and hold technique and a linear interpolation technique. These two techniques are illustrated on the functions $F_\omega$ (d) and $F_\omega'$ (k) shown in FIGS. 6A and 6B, although it should be emphasized that the interpolation techniques are actually applied to the discontinuous function $G_\omega''$ (D) to form the continuous function $I_\omega''$ (D). In reference to FIG. 6, the sample and hold process maintains the value of $F_\omega$ ($k_i$) until an adjacent value is found, $F_\omega$ ($k_{i+1}$) as shown at A. This method can easily be implemented in the computer software during data analysis. This method may also be implemented when using the delay and sum method of beamforming by weighing each sample proportional to its surrounding spce interval, $\Delta d$. The linear interpolation approach simply provides a straight line connection between adjacent sample points as shown at B in FIGS. 6A and 6B.

It is mentioned that these two interpolation techniques might also be applied to the functions $F_\omega$ (k) to obtain a continuous function $F_\omega'$ (d) for use in step 2 of FIG. 7. Using interpolation on the function $G_\omega''$ (D) is much more important, however, since for N large, the number of points in D-space is approximately $N^2$, providing many more points to do an effective interpolation. Due to the high number of points $N^2$, the interpolation remains effective at substantially high spatial frequencies.

After the interpolation step 5, the next step is to perform the spatial Fourier transform to the continuous function $I_\omega''$ (D) to obtain the transform function $T_\omega$ (F) as indicated in step 6. Thus $$T_\omega(F) = Re[\int I_\omega''(D)e^{j2\alpha FD}dD]. \quad (4)$$

In step 7, the functions $T_\omega$ (F) is averaged and the result is interpreted in terms of the far field power function $P_\omega$ ($\theta$). This time averaging process could alternately be applied earlier to the functions $G_\omega''$ (D) or $I_\omega''$ (D).

The procedure outlined above in reference to FIG. 7 is based on the mathematical equivalence between two processes: (1) Fourier transformation followed by conjugate multiplication, and (2) convolution followed by Fourier transformation. By applying this mathematical equivalence in the spatial domain, the FFT beamforming of FIG. 5B can be replaced with the beamforming process of FIG. 7 with identical results obtained under uniform element spacing geometries. What is surprising and unique, however, is that the convolution approach shown in FIG. 7 gives preferred results when random sensor element spacings are employed. It is postulated that in situations where the far field dominates and power from any angle is independent of the power of all other angles, that $$\overline{G_\omega''(D)} = \overline{G_\omega(D)}$$

where the bar symbols denote time average values, and $G_\omega$ (D) is the autoconvolution of the *fully filled* continuous function $F_\omega$ (d) of FIG. 6.

It should be noted that the averaging process is one normally required by the beamforming process if far field *power* measurements, as opposed to time signal, are required. Thus, the requirement for averaging in itself requires no additional complexity.

Sidelobe Control by Shading

Control over the sidelobe levels of a random array may be achieved by weighting small values of D more heavily than larger values of D. This shading effect may be achieved by applying a shading term to the computation of $G_\omega''$ (D) such that:

$$G_\omega''(D) = \frac{F_\omega''(D)}{W''(D)}\left[1 - \frac{D}{D_{MAX}}\right] \quad (5)$$

where $D_{MAX}$ is the maximum separation distance between any two sensing elements for the data set being processed.

Hardware Description

FIG. 8 is a block diagram showing the hardware elements utilized in implementing the flowchart of FIG. 7. The illustrated elements may all be contained on a remote ship or aircraft. Modulated RF data signals are received on separate channels from the plurality of sensing elements 32 and are fed from antenna 60 to demodulator circuits 62a . . . 62N. The multi-channel data signals may be stored, on tape, for example, by analog storage device 64, for subsequent processing. The analog storage may be omitted altogether or proceed simultaneously with the data processing. A multiplexing unit 66 receives the demodulated multi-channel signals and sequentially feeds them to an A/D unit 68. Alternatley, plural A/D converters may be used without the multiplexer 66. The digitized data signals are block stored in storage device 70. Clock oscillator 72 generates plural clock signals for synchronizing operation of the various hardware units. If one is interested in measuring frequencies up to 500 Hz, clock C may, for example, be chosen to be the Nyquist sampling rate of 1 KHz whereas clock C1 may conveniently be chosen at one second. Under these conditions, a new block of data from the N sensors is obtained every second, each block containing 1K data values for each sensing element 34.

The blocked data from storage device 70 is fed to FFT unit 74 with the results stored in memory device 76. From the 1K sampling rate, there are generated 500 discrete coefficients for each of the N sensing elements. The data is stored in groups such that coefficients of the same frequency are stored in contiguous memory locations. For example, $F_\omega$ (1), $F_\omega$ (2) ... $F_\omega$ (k) ... $F_\omega$ (N) form a column of stored Fourier coefficients all having the same frequency $\omega$. The value $\omega 1$ in the memory device 76 corresponds to the maximum frequency, for example, 500 Hz. Output data from each column of the memory device 76 is then fed to a convolution processor 80 which implements equation (3). The convoluted data containing approximately $N^2/2$ points is then filled in by interpolation to obtain a continuous function which undergoes the spatial frequency transformation to obtain the coefficients $T_\omega$ (F), as indicated at block 82. These coefficients are time averaged at 84 and fed to an output device which may display the data on a CRT or provide a hard copy plot or other permanent record. It is noted that the processing hardware for performing the FFT, convolution interpolation, spatial frequency transformation and time averaging, may all be the same programmed digital computer or may be implemented on separate plural data processing units.

Computer Simulation Results for Synthesized Random Linear Array

FIG. 9 is a sensor location plot which describes the locations of 32 sensors distributed on a one dimensional aperture of $16\lambda T$ dimension. If $T=1$, the array is designated "filled" with an average inter-element spacing of ½ wavelength, satisfying the Nyquist sampling criterion. If $T>1$, the array is designated as "thinned" and the spatial information is undersampled. The specific location of the 32 sensors were obtained from a random number generator with uniform distribution from 0 to $16\lambda T$.

Figure 10:
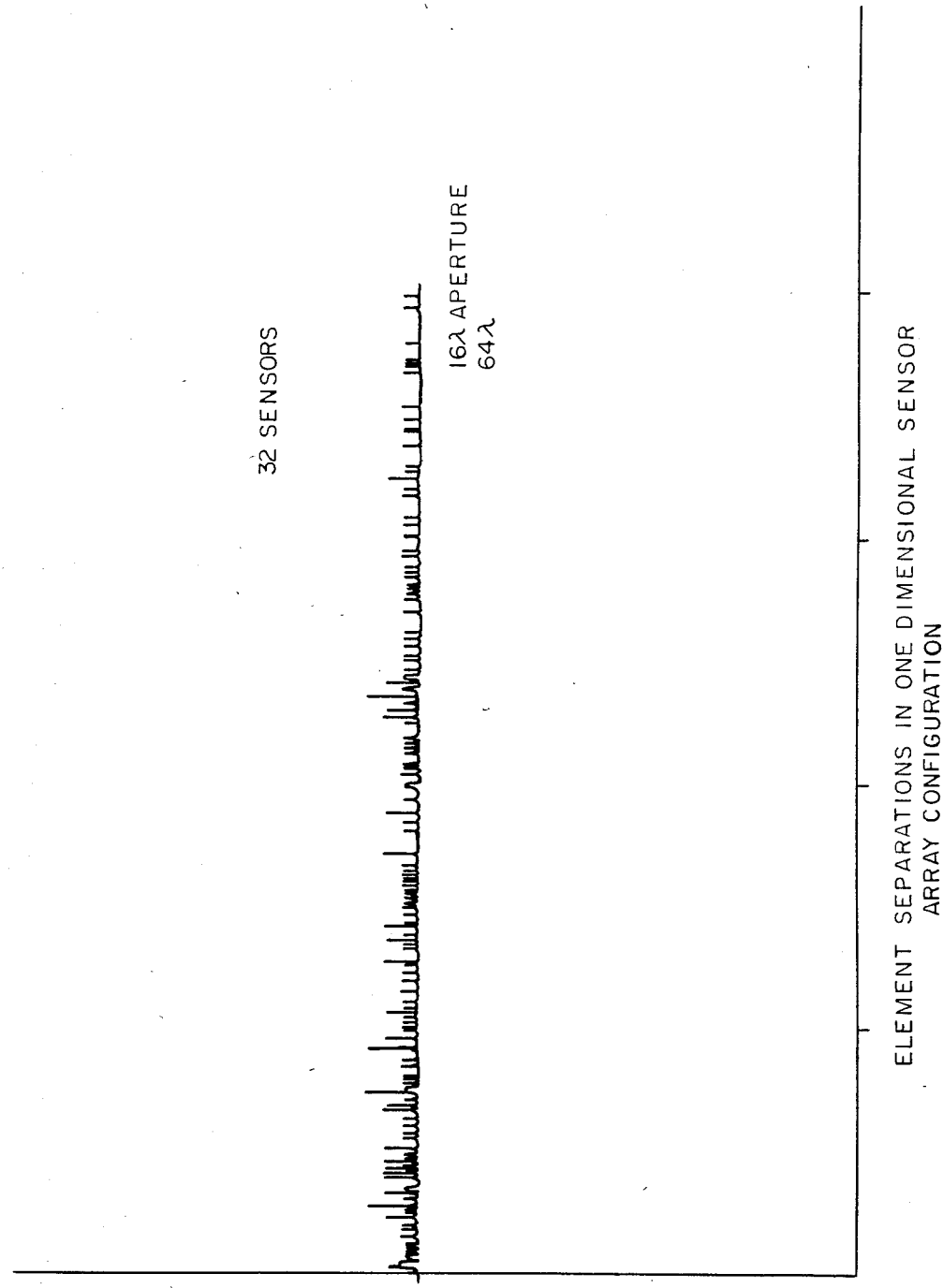
FIG. 10 is a plot showing the sensor separation of the array of FIG. 9.

FIG. 10 shows separations of the 32 sensors taken 2 at a time. It is clear that the sensor separation plot exhibits a much higher spatial density of information than does the sensor location plot. If N is the number of randomly distributed sensors, there exists a maximum of $(N^2-N)/2+1$ sensor separations. If the N sensors were uniformly distributed (spaced), there would exist only N different sensor separations. Thus, there is a distinct number advantage of random spacing over uniform spacing.

For the example shown, the number of sensor separations is approximately 500. The sensor separations tend to concentrate at small values of inter-element spacings. Nevertheless, an overall increase in separation density occurs compared to that for a uniform array. This increased density represents an important feature of the invention when implementing methods of reducing sidelobe response to the random array.

Figure 11:
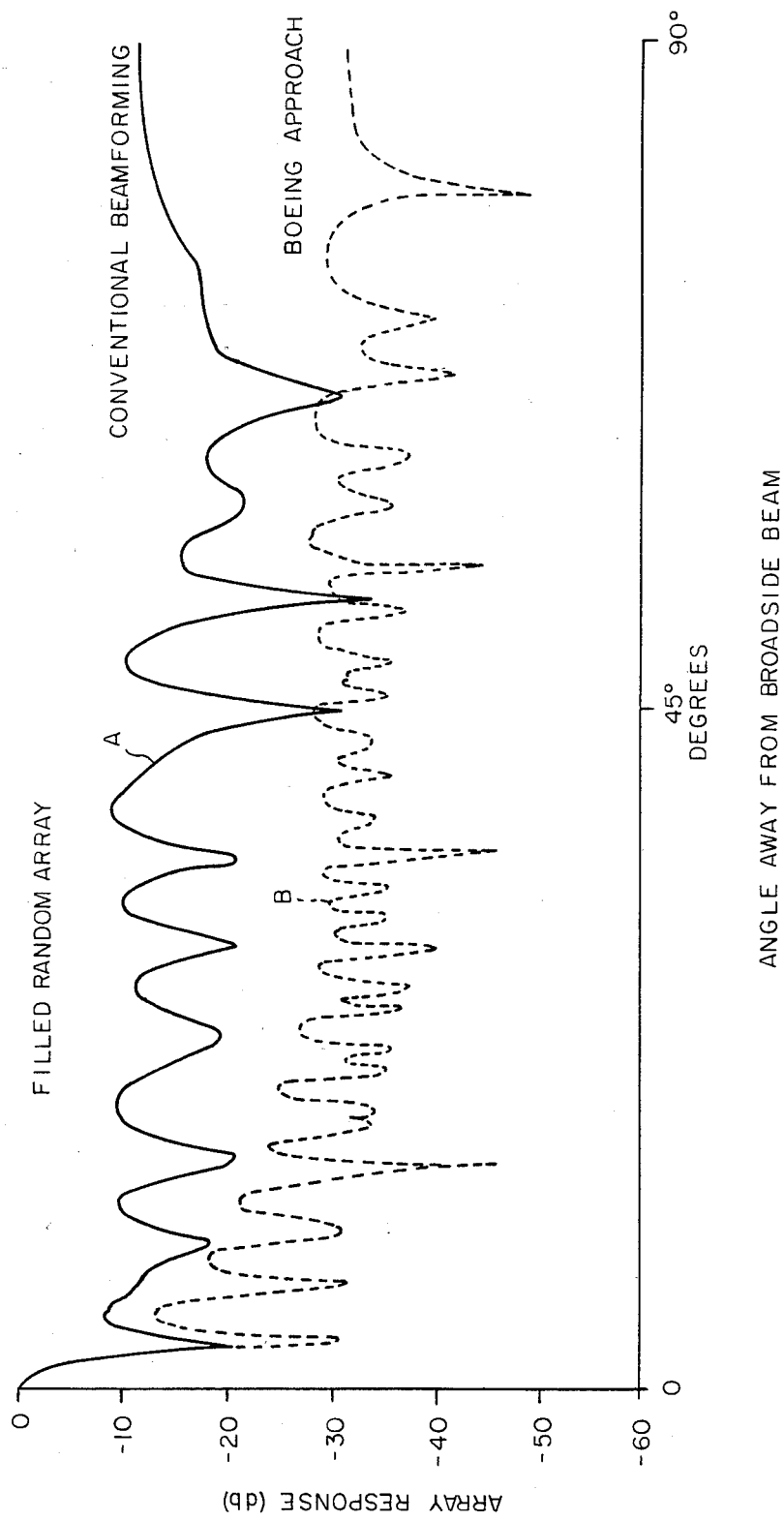
FIG. 11 is a graph plotting the polar response of data in a filled random array processed both conventionally and in accordance with the principles of the invention.

FIG. 11 plots the polar response of data processed conventionally and in accordance with the invention. Graph A represents a conventionally processed random array of 32 sensors distributed over a $16\lambda$ aperture. Signals from the 32 sensors are time delayed, summed, squared and averaged in accordance with FIG. 5A.

For a far field signal arriving from an angle $\beta$, the response of the $k^{th}$ sensor is;

$$S_k(t,\theta) = \cos \omega \left( t - \frac{d_k}{c} (\sin \theta - \sin\beta) \right) \quad (6)$$

Angles are defined from the perpendicular to the array, and the location of the $k^{th}$ sensor is a distance $d_k$ from the origin. For the results shown, the array is steered to a broadside beam so that $\beta=0°$ in equation (6).

The signal frequency, $\omega$, and the propagation speed, C, are related to the signal wavelength, $\lambda$, by $\pi 2C=\omega\lambda$. When $\theta=\beta$, the beam is steered to the signal source and maximum response occurs.

For the example selected (FIG. 11), the average sidelobe level for the conventionally processed random array shown in graph A is approximately $-15$ db below the main lobe response. But 7 peak sidelobes higher by more than 5 db can be counted. These peak sidelobes can contribute to significant interference from off-axis sources since only 10 db attenuation is applied.

Graph B of FIG. 11 shows the polar array response for the same 32 sensors, $16\lambda$ aperture configuration processed with the convolution beamforming method (FIG. 7 with interpolation performed between the convolution values of equation 3). The average sidelobe level has been suppressed to $-30$ db, as opposed to $-15$ db for the conventional array. The peak sidelobes are again approximately 5 db higher than the average sidelobe level and are seen to be more numerous. Towards endfire ($\beta=90°$) the sidelobes broaden.

The interpolation algorithm used was a 3 sample proximity weighted process which used the third sample to improve upon the 2 sample linear interpolation. This process is useful especially when the spatial frequency of the Fourier transform function is high.

Figure 12:
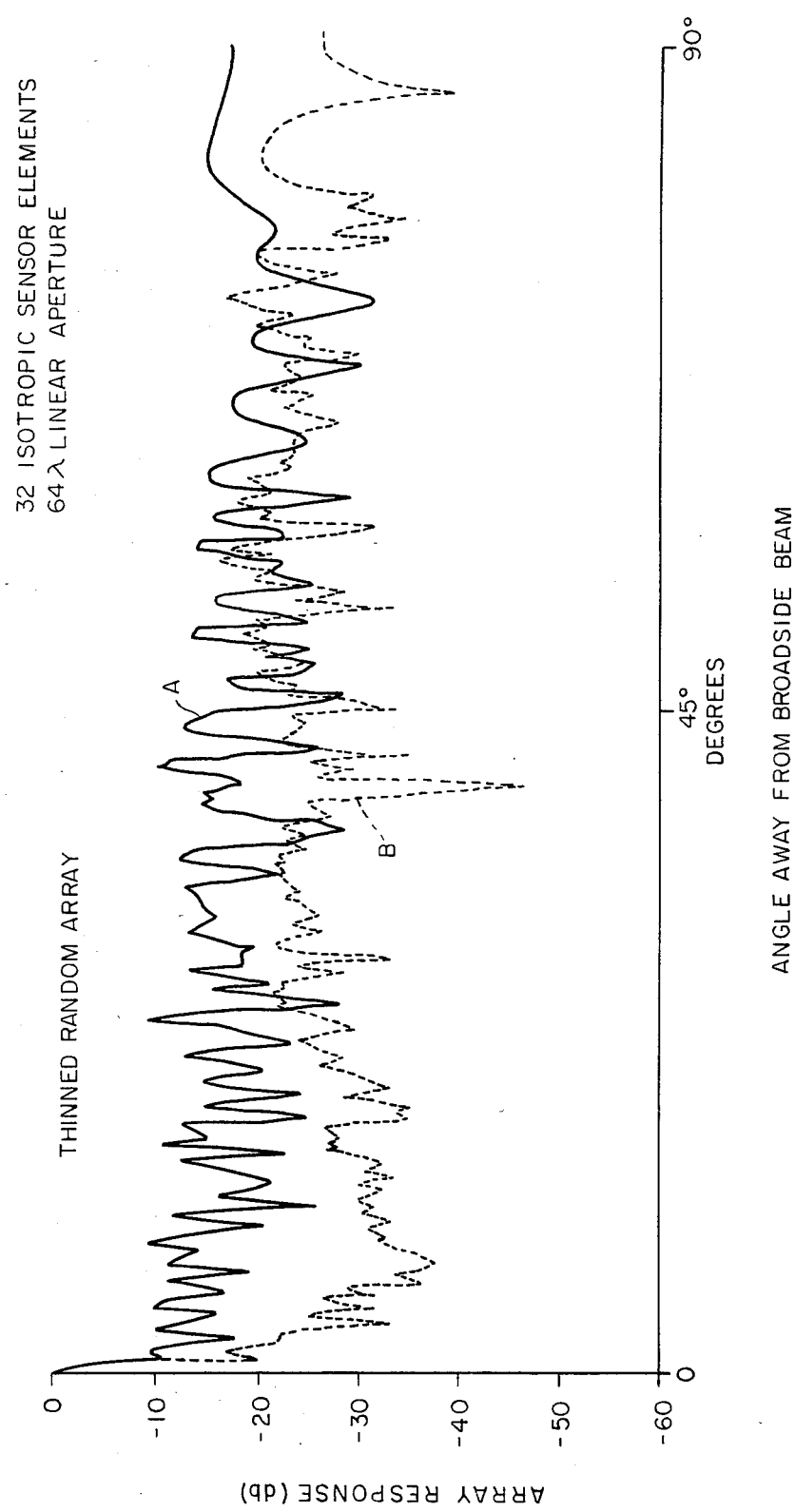
FIG. 12 is a graph plotting the polar response of data in a thinned random array processed both conventionally and in accordance with the principles of the invention.

FIG. 12, graph A shows the polar response for conventional beamforming applied to the array configuration shown in FIG. 9 with $T=4$ to effectively increase the aperture from $16\lambda$ to $64\lambda$. The implications of a thinned array is that the average inter-sensor spacing is now larger than ½ signal wavelength so signal information can be undersampled. Undersampling normally introduces grating-lobes, but the randomization of the sensor elements tends to remove the gratinglobes. However, the previously discussed limitations of high average sidelobe and many peak sidelobes exceeding the average still remain. The larger aperture D does result in a narrower main lobe beam width, as expected.

In graph A, the average sidelobe level is only down about $-15$ db. This is the same result as in FIG. 11 for the filled array. The differences are in the number of peak sidelobes exceeding this average (about 4 times as many). It is noted, however, that the exceedance is the same at about 5 db above the average.

In graph B of FIG. 12, the array response is plotted for the convolution/interpolation process of FIG. 7. Much lower sidelobes are shown down to approximately $-30$ db, for "close in" angles. This is the same $-15$ db improvement that was found for the filled array. In the thinned configuration, however, this 15 db improvement does not extend to large off-axis angles. In fact, the improvement is less than 5 db at approximately 60° from broadside.

As arrays become progressively thin, the improvement obtained over conventional processing diminishes.

Practical Applications—2 Dimensional Arrays

Extension of the described concepts to 2-dimensional arrays is straightforward if one can define equivalent 1D and 2D interpolation algorithms and equivalent 1D and 2D Fourier transformation formula.

In practice, the 2D interpolation algorithm is difficult to implement accurately because practical 2D arrays exhibit high amounts of "thinning." Furthermore, as seen in FIG. 12, the sidelobe performance achieved by Fourier transform of the interpolated function ($I_\omega''(D)$) is only marginally better than conventional (i.e., Steinberg) when high amounts of thinning are present.

In applying the convolution concept of the invention to thinned 2D (or 3D) random arrays, it is desirable to use an improved method of Fourier transforming a randomly sampled signal.

Simultaneous Equation

An alternate solution to the beamforming problem which is especially useful for thin arrays is the simultaneous equation technique. This technique is identical in its early processing steps to the interpolation solution as may be seen in reference to steps 1–3 of the flowchart of FIG. 7. Once the array is determined to be thin in step 4 of FIG. 7, the next step is to shade the function $G_\omega''(D)$ in accordance with equation (5) as indicated at step 9 in FIG. 13. The results are then time averaged in step 10, and the magnitudes of the spatial frequency components are obtained by the simulatneous equation technique of step 11 to be explained more fully below. The resulting data is provided to an output device which may be a memory storage device, a CRT display, a hard copy plot or the like.

The use of simultaneous equations is practical because of two aspects of the data processing:

(1) The time domain frequency filtering of the FFT analysis applied separately to each signal input has the effect of limiting the range of spatial domain frequencies covered by $G_\omega''(D)$. This greatly reduces the number of unknown Fourier coefficients and consequently leads to a proportional reduction in the number of unknowns in the simultaneous linear equations to be solved.

(2) The shading processes for reducing sidelobe amplitudes applied to $G_\omega''(D)$ (step 9, FIG. 8), serves to restrict the range of spatial frequency dispersion and thereby also helps in reducing the number of unknowns in the simultaneous equations.

By exploiting these features, the number of unknowns associated with 2D or 3D arrays can be reduced to a satisfactory extent for practical implementation. The description herein is made for 2D random arrays. Those skilled in the art may easily extend the method to 3D (and 1D) arrays.

To keep the number of Fourier coefficient unknowns to a reasonable limit, one can apply narrow band time domain frequency filtering to the signals from the individual array elements, thereby restricting the sensed spatial frequencies to a narrow annulus in the spatial frequency domain, as seen in FIG. 14.

FIG. 14 represents two sensing elements 32a and 32b which define a cross sensor separated by a distance Dj apart. The index j represents a given pair of the N sensors, so that $0 < j < N(N-1)/2$. The index p identifies a far field source direction, and the magnitude of the $p^{th}$ spatial frequency, $X_p$, is the unknown desired to be determined from assumed guesses of the far field source directions $\theta_p$. These unknown Fourier components $X_p$ may be equally spaced along the central circle of the annulus. This approach, however, led to instability in the simultaneous equation solution, presumably because the defined unknown Fourier components do not possess "orthogonality" characteristics.

To obtain a stable set of simultaneous equations involving a moderate number of unknowns, the following procedure is followed:

(1) Weight the measurements $G_\omega''(D_x,D_y)$ by a shading function $W(D_x,D_y)$ that has the effect of preventing any appreciable spectral measurement dispersion when applying the Fourier transformtion operation.

(2) Define a set of orthogonal Fourier spatial components $X = X(W_x,W_y)$ within a grid with $\omega_x = 2\pi r/X$ and $\omega_y = 2\pi q/Y$ where r and q take on all integer values that locate $W(W_x,W_y)$ inside a moderate size annulus in the spatial frequency plane formed by convoluting the Fourier transform of the shading window $W(D_x,D_y)$ with the narrow annulus of FIG. 10. See FIG. 11.

(3) Simultaneous equations are formed by equating each of the weighted input values $G_\omega''(D_x,D_y) \cdot W(D_x,D_y)$ to the linear sum of the limited number of Fourier components (these related to spatial frequencies inside the moderate size annulus).

The simultaneous equations are given below with FIGS. 14 and 15 transcribing the geometries $$\sum_{p=1}^{M} X_p \cos\left\{ 2\pi \frac{D_j}{\lambda_p} \cos(\alpha_j - \theta_p) \right\} = W_j G_j'(D) \quad (7)$$

where
$X_p$ magnitude of the $p^{th}$ spatial frequency
$1/\lambda_p$ (spatial) frequency of the $p^{th}$ unknown
$\theta_p$ direction angle to $p^{th}$ unknown
$D_j$ $j^{th}$ cross sensor separation $\alpha_j$ $j^{th}$ cross sensor angle
$G_j'(D)$ real part of $j^{th}$ inphase cross power averaged measurements
$W_j$ $j^{th}$ weighting applied to $G_j''(D)$
M is the total number of orthogonal spatial frequencies inside the annulus.

In practice, the number of cross sensors j is expected to exceed the number of orthogonal spatial frequencies M. Then a minimum least square error solution for the Fourier components $X_p$ represents an estimate of the Fourier transform of the continuous function $I_\omega''(D_x,D_y)$ where $I_\omega''(D_x,D_y)$ is a fit to the discontinuous function $G_\omega''(D_x,D_y)$.

In equation (8), j takes on values between 1 and $N(N-1)/2 \simeq N^2/2$. It is necessary to solve the $\simeq N^2/2$ simultaneous equations in M unknowns by appropriate elimination methods depending on whether $M = N^2/2$, $M < N^2/2$, or $M > N^2/2$. For most practical applications, the number of cross sensor measurements $N^2/2$ will exceed the number of unknowns M and equation (7) is deemed overdetermined. A method incorporating least squares error combined with Householder transformations may be used to solve equation (7). Equation (7) is applicable to both one- or two-dimensional random arrays ($\alpha_j = 0$, $\lambda_p = c/f_o$ for one-dimensional arrays). It is significant that the number of cross sensors is substantially larger than the number of conventional sensors and is approximately $N^2/2$ if the conventional sensors are randomly distributed.

The location of the M unknowns in the spatial frequency domain is somewhat selectable but best results have so far been obtained by distributing the unknowns at uniform spatial frequency increments. For the one-dimensional array, this procedure corresponds to non-uniform distribution in angle where "broadside" angles are more densely sampled than "end fire" angles. The procedure can be visualized by examining FIG. 14 and marking off uniform increments along the horizontal axis and noting the intersection of vertical lines on the unit frequency circle.

Far Field Response

The simultaneous equation techniques for improved Fourier transformation of randomly sampled signals have been applied to two beamforming cases. In these cases, randomly distributed sensor elements are synthesized to form a receiving array. A coherent target is placed in the far field, approximately eight degrees from broadside, and the response of the array (acting as a cross power sampler) is computed as a function of angle. The solution of the overdetermined set of simultaneous equation (7) was performed using the least square Householder transformation algorithm available from Boeing Computer Services, Seattle, Washington, Library Subroutine b 1974. The two cases include (1) a one-dimensional random array comprised of 32 elements distributed over a 16 wavelength aperture, and (2) a two-dimensional random array of the same number of sensor elements but square aperture $16\lambda \times 16\lambda$. It is noted that the one-dimensional array is Nyquist filled (average inter-element separation of $\frac{1}{2}$ wavelength) while the two-dimensional array is substantially "thin."

Figure 17:
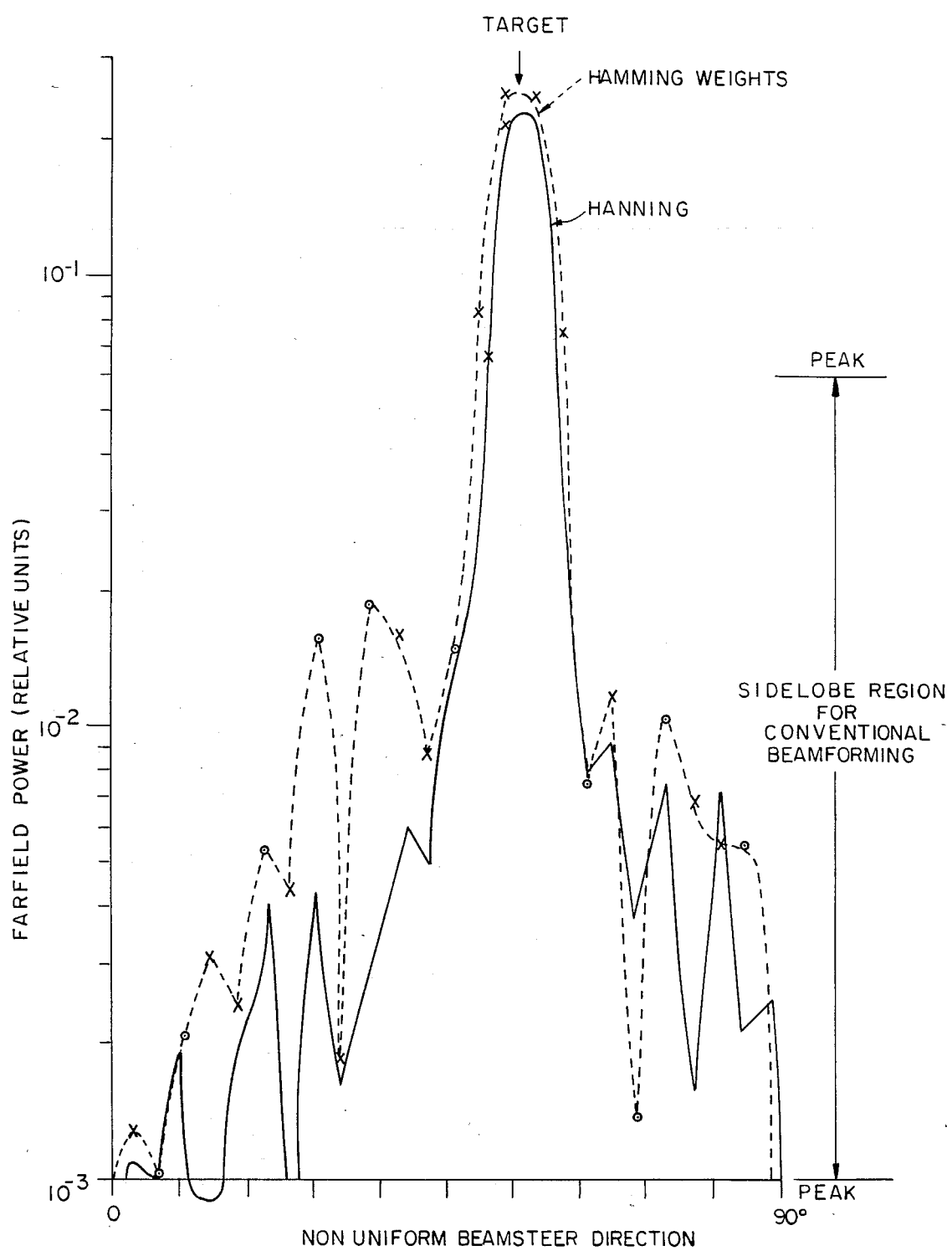
FIG. 17 shows a polar plot of the results of the simultaneous equation technique for a two dimensional array.

The results for the linear random array are shown in FIG. 16. It is found that the application of weighting to the cross product measurements does reduce the sidelobes substantially below the unweighted performance. However, a comparison with the results in FIG. 11 confirms that for the unthinned array case, the simultaneous equation approach gives only slightly better performance than the linear interpolator method. Results for the two-dimensional thinned array (32 elements randomly distributed over an area of 16 wavelengths $\times$ 16 wavelengths) are shown in FIG. 17.

The shading process reduces the sidelobes well below the unshaded values despite the substantial thinning of the array. The linear interpolation method of FIG. 12 had largely failed to achieve sidelobe reduction by shading when the array was thinned. It is also important to note that application of the linear interpolation process in a two-dimensional manner is not straightforward so the simultaneous equation approach not only offers better performance but is easier to implement in two dimensions.

Although the invention has been described with reference to the preferred embodiments described herein, various modifications and improvements may be made by those skilled in the art and the invention is intended to cover such modifications and improvements which come within the scope of the appended claims.

I claim:
1. Beamforming apparatus comprising:
  (a) a plurality of transducers randomly distributed for receiving radiant energy, said transducers generating analog output signals indicative of the received radiant energy,
  (b) means for converting said analog transducer output signals at a predetermined sampling rate into digital signals,
  (c) means for storing a group of said digital signals for each transducer,
  (d) means for performing a discrete Fourier transformation of each group of digital signals to obtain Fourier frequency coefficients $F_\omega(k)$ where $\omega$ identifies the frequency and k is an integer having values 1,2 ... N identifying the transducer, N being the total number of distributed transducers,
  (e) means for spatially convolving said coefficients $F_\omega(k)$ of equal $\omega$ to obtain a set of coefficients $G_\omega''(D)$ where D is the spacing between pairs of transducers,
  (f) means for generating additional values of $G_\omega''(D)$ by interpolation to obtain a substantially continuous function $I_{107}''(D)$,
  (g) means for performing a spatial Fourier transformation of $I_{107}''(D)$ to obtain a transform function $T_f(F)$ where F is a parameter representing the different spatial frequencies in $I_{107}''(D)$
  (h) means for averaging a plurality of values of at least one of $G_\omega''(D)$, $I_\omega''(D)$ and $T_\omega(F)$ from a plurality of said output signal groups, and
  (i) means, responsive to the averaged or average-derived value of $T_\omega(F)$ for generating an output representative of the far field power of said radiant energy as a function of angle.

2. Apparatus as recited in claim 1 wherein said transducers are responsive to acoustic radiant energy and are distributed in water for sensing acoustic energy radiated from submerged or surface vessels.

3. Apparatus as recited in claim 1 further comprising means for periodically determining the relative position of each of said transducers.

4. Apparatus as recited in claim 1 wherein said means for converting comprises means for sampling the output signal of said transducer at a sampling rate at least twice that of the maximum radiation frequency $\omega$ and for generating the discrete Fourier transform component of said sampled output signals.

5. A method of beamforming comprising the steps of:
  (a) deploying a plurality of sensing elements, said sensing elements free to take up random positions and each sensing element generating output signals in response to sensed radiation,
  (b) detecting output signals from each of the sensing elements,
  (c) determining the relative positions of said sensing elements,
  (d) generating Fourier frequency components of each output signal,
  (e) selecting a Fourier frequency component $F_\omega(k)$ for a given radiation frequency $\omega$ from said output signals of each of said sensed elements thereby forming a group of frequency components $F_\omega(k)$ where k is an integer identifying a sensing element and having values k=1,2 ... N, where N is the integer number of deployed sensing elements,
  (f) spatially convolving said group of frequency components to obtain a set of coefficients $G_\omega''(D)$ where D is the spacing between pairs of sensing elements,
  (g) interpolating additional values of $G_\omega''(D)$ between said set of coefficients to obtain a substantially continuous function $I_\omega''(D)$,
  (h) spatially Fourier transforming $I_\omega''(D)$ to obtain the transform function $T_\omega''(F)$, where F is a parameter representing the different spatial frequencies in the $I_\omega''(D)$ function, (i) time averaging a plurality of values of at least one of $G_\omega''(D)$, $I_\omega''(D)$ and $T_\omega''(F)$ from a plurality of said output signal groups, and (j) after step i, providing an output of said averaged or average-derived transform function $T_\omega''(F)$ indicative of the far field power of said radiation as a function of angle.

6. A beamforming method as recited in claim 5 wherein said plurality of sensing elements form an array and said method further comprising the step of multiplying the continuous function $I_\omega''(D)$ with a shading function for weighting outer sensing elements of said array less than inner sensing elements of said array.

7. A beamforming method as recited in claim 5 wherein said deployment step includes randomly distributing said plurality of sensing elements in water for sensing submerged or surface vessels, said detecting step including detecting acoustic radiation from said vessels.

8. A beamforming method as recited in claim 5 wherein said step of providing an output includes generating a plot of the far field power as a function of angle.

9. A beamforming method as recited in claim 8 wherein said step of generating a plot includes displaying said plot on a CRT device.

10. A beamforming method as recited in claim 5 further comprising the step of periodically determining the relative position of each of said plurality of sensing elements.

11. A beamforming method as recited in claim 5 further comprising the steps of sampling the output signals at a sampling rate at least twice that of the given radiation frequency $\omega$ and generating the discrete Fourier frequency component of said sampled output signals.

12. A beamforming method as recited in claim 5 wherein said time averaging step includes time averaging $I_\omega''(D)$.

13. A beamforming method as recited in claim 5 wherein said plurality of sensing elements form an array and said method further comprising the step of multiplying the convolution coefficients $G_\omega''(D)$ with a shading function for weighting outer sensing elements of said array less than inner sensing elements of said array.

14. A method of beamforming comprising the steps of:

(a) deploying a plurality of sensing elements, said sensing elements free to take up random positions, each sensing element generating output signals in response to sensed radiation, (b) detecting output signals from each of the sensing elements, (c) generating Fourier frequency components of each output signal, (d) selecting a Fourier frequency component $F_\omega(k)$ for a given radiation frequency $\omega$ from said output signals of each of said sensed elements thereby forming a group of frequency components $F_\omega(k)$ where k is an integer identifying a sensing element having values k=1,2 ... N, where N is the integer number of deployed sensing elements, (e) spatially convolving said group of frequency components to obtain a set of coefficients $G_\omega''(D)$ where D is the spacing between pairs of sensing elements, (f) multiplying the set of coefficients $G_\omega''(D)$ by applying a shading function thereto, said shading function weighting smaller values of D more heavily than larger values of D, (g) taking an average value of the shading multiplied coefficients $G\omega''(D)$ to obtain $\overline{G_\omega''(D)}$, (h) solving a set of simultaneous equations for the unknown spatial frequency coefficients $X_p$, $$\sum_{P=1}^{M} X_p \cos\left(2\pi \frac{D_j}{\lambda_p} \cos(\alpha_j - \theta_p)\right) = W_j Re[\overline{G_\omega''(D)}]$$

where $1/\lambda_p$ is the spatial frequency of the $p^{th}$ unknown,
$\theta_p$ is the direction angle to the $p^{th}$ unknown,
$D_j$ is the $j^{th}$ cross sensor separation,
$\alpha_j$ is the $J^{th}$ cross sensor angle,
$W_j$ is the weighting factor,
$Re[\overline{G_\omega''(D)}]$ is the real part of $\overline{G_\omega''(D)}$, and
M is the number of orthogonal frequency components; and (i) providing an output of said spatial frequency coefficients $X_p$ as a function of $\theta_p$.

15. A method as recited in claim 14 wherein said deployment step includes randomly distributing said plurality of sensing elements in water for sensing submerged or surface vessels, said detecting step including detecting acoustic radiation from said vessels.

16. A method as recited in claim 14 wherein said step of providing an output includes generating a plot of the far field power as a function of angle.

17. A method as recited in claim 14 wherein said step of generating a plot includes displaying said plot on a CRT device.

18. A method as recited in claim 14 further comprising the step of periodically determining the relative position of each of said plurality of sensing elements.

19. A method as recited in claim 14 further comprising the steps of sampling the output signals at a sampling rate at least twice that of the given radiation frequency $\omega$ and generating the discrete Fourier frequency component of said sampled output signals.

20. A beamforming apparatus comprising:

(a) a plurality of transducers randomly distributed for receiving radiant energy, said transducers generating analog output signals indicative of the received radiant energy, (b) means for converting said analog transducer output signals at a predetermined sampling rate into digital signals, (c) means for storing a group of said digital signals for each transducer, (d) means for performing a discrete Fourier transformation of each group of digital signals to obtain Fourier frequency coefficients $F_\omega(k)$ where $\omega$ identifies the frequency and k is an integer having values 1,2 ... N identifying the transducer, N being the total number of distributed transducers, (e) means for spatially convolving said coefficients $F_\omega(k)$ for a given $\omega$ value to obtain a set of coefficients $G_\omega''(D)$ where D is the spacing between pairs of transducers, (f) means for multiplying the set of coefficients $G_\omega''(D)$ by applying a shading function thereto, said shading function weighting smaller values of D more heavily than larger values of D, (g) means for taking an average value of the shading multiplied coefficients $G_\omega''(D)$ over a plurality of said groups of digital signals $\overline{G_\omega''(D)}$, (h) means for solving a set of simultaneous equations for the unknown spatial frequency coefficients $X_p$, $$\sum_{P=1}^{M} X_p \cos\left\{ 2\pi \frac{D_j}{\lambda_p} \cos(\alpha_j - \theta_p) \right\} = W_j Re[\overline{G_\omega''(D)}]$$

where $1/\lambda_p$ is the spatial frequency of the $p^{th}$ unknown, $\theta_p$ is the direction angle to the $p^{th}$ unknown, $D_j$ is the $j^{th}$ cross sensor separation, $\alpha_j$ is the $j^{th}$ cross sensor angle, $W_j$ is the weighting factor, $Re[\overline{G_\omega''(D)}]$ is the real part of $\overline{G_\omega''(D)}$, and M is the number of orthogonal frequency components; and (i) means for providing an output of said spatial frequency coefficients $X_p$ as a function of $\theta_p$.

21. A beamforming apparatus as recited in claim 20 wherein said transducers are responsive to acoustic radiant energy and are distributed in water for sensing acoustic energy radiated from submerged or surface vessels.

22. A beamforming apparatus as recited in claim 20 further comprising means for periodically determining the relative position of each of said transducers.

23. A beamforming apparatus as recited in claim 20 wherein said means for converting comprises means for sampling the output signal of said transducer at a sampling rate at least twice that of the maximum radiation frequency $\omega$ and for generating the discrete Fourier transform component of said sampled output signals.

24. A method of beamforming comprising the steps of:

(a) deploying a plurality of sensing elements, said sensing elements free to take up random positions, each sensing element generating output signals in response to sensed radiation, (b) detecting output signals from each of the sensing elements, (c) generating Fourier frequency components of each output signal, (d) selecting a Fourier frequency component $F_\omega(k)$ for a given radiation frequency $\omega$ from said output signals of each of said sensed elements thereby forming a group of frequency components $F_\omega(k)$ where k is an integer identifying a sensing element and having values $k = 1, 2 \ldots N$, where N is the integer number of deployed sensing elements, (e) spatially convolving said group of frequency components to obtain a set of coefficients $G_\omega''(D)$ where D is the spacing between pairs of sensing elements, (f) if the number of said plurality of sensing elements is larger than $2A/\lambda$ for a one-dimensional array or $4(Ax,Ay/\lambda^2)$ for a two-dimensional array where A is the aperture of said plurality of sensing elements for said one-dimensional array and (Ax,Ay) is the aperture of said two-dimensional array and $\lambda = \frac{1}{2}\pi\omega$, then (i) interpolating additional values of $G_\omega''(D)$ between said set of coefficients to obtain a substantially continuous function $I_\omega''(D)$, (ii) spatially Fourier transforming $I_\omega''(D)$ to obtain the transform function $T_\omega''(F)$, where F is a parameter representing the different spatial frequencies in $I_\omega''(D)$, (iii) averaging a plurality of values of at least one of $G_\omega''(D)$, $I_\omega''(D)$ and $T_\omega''(F)$ over a plurality of said groups of frequency components, and (iv) after step (f) (iii), providing an output of said averaged or average-derived transform function $T_\omega''(F)$ indicative of the far field power of said radiation as a function of angle, and (g) if the number of said plurality of sensing elements is smaller than in step (f) then (i) multiplying the set of coefficients $G_\omega''(D)$ by applying a shading function thereto, said shading function weighting smaller values of D more heavily than larger values of D, (ii) taking an average value of the shading multiplied coefficients $G_\omega''(D)$ over a plurality of said groups of frequency components to obtain $\overline{G_\omega''(D)}$, (iii) solving a set of simultaneous equations for the unknown spatial frequency coefficients $X_p$, $$\sum_{P=1}^{M} X_p \cos\left\{ 2\pi \frac{D_j}{\lambda_p} \cos(\alpha_j - \theta_p) \right\} = W_j Re[\overline{G_\omega''(D)}]$$

where $1/\lambda_p$ is the spatial frequency of the $p^{th}$ unknown, $\theta_p$ is the direction angle to the $p^{th}$ unknown, $D_j$ is the $j^{th}$ cross sensor separation, $\alpha_j$ is the $j^{th}$ cross sensor angle, $W_j$ is the weighting factor, $Re[G_\omega''(D)]$ is the real part of $G_\omega''(D)$, and M is the number of orthogonal frequency components and (iv) providing an output of said spatial frequency codfficients $X_p$ as a function of $\theta_p$.

25. A method as recited in claim 24 wherein said deployment step includes randomly distributing said plurality of sensing elements in water for sensing submerged or surface vessels, said detecting step including detecting acoustic radiation from said vessels.

26. A method as recited in claim 24 wherein said detecting step comprises the steps of sampling the output signals at a sampling rate at least twice that of the given radiation frequency $\omega$ and generating the discrete Fourier frequency component of said output signals.

* * * * *